(12) United States Patent
Barnett et al.

(10) Patent No.: US 8,285,348 B2
(45) Date of Patent: Oct. 9, 2012

(54) HAND PORTABLE ELECTRONIC DEVICE HAVING A PLURALITY OF MODES OF OPERATION

(75) Inventors: Ricky Barnett, Hertfordshire (GB); Brian Davidson, Surrey (GB)

(73) Assignee: Nokia Corporation, Espoo (FI)

( * ) Notice: Subject to any disclaimer, the term of this patent is extended or adjusted under 35 U.S.C. 154(b) by 1176 days.

(21) Appl. No.: 11/795,546

(22) PCT Filed: Feb. 11, 2005

(86) PCT No.: PCT/IB2005/000358
§ 371 (c)(1),
(2), (4) Date: Mar. 7, 2008

(87) PCT Pub. No.: WO2006/085129
PCT Pub. Date: Aug. 17, 2006

(65) Prior Publication Data
US 2008/0227502 A1    Sep. 18, 2008

(51) Int. Cl.
*H04M 1/00* (2006.01)
(52) U.S. Cl. .................... 455/575.4; 379/433.12
(58) Field of Classification Search .......... 455/566, 455/575.4, 550.1, 575.1; 379/433.12, 433.01, 379/433.04; 345/169, 168, 156, 158; 361/727
See application file for complete search history.

(56) References Cited

U.S. PATENT DOCUMENTS

| | | | |
|---|---|---|---|
| 7,076,058 B2 * | 7/2006 | Ikeuchi et al. | 379/433.12 |
| 7,907,981 B2 | 3/2011 | Baek | 455/575.4 |
| 2003/0073414 A1 * | 4/2003 | Capps | 455/90 |
| 2005/0014538 A1 * | 1/2005 | Hyun et al. | 455/575.4 |
| 2005/0032557 A1 * | 2/2005 | Brunstrom et al. | 455/575.1 |
| 2006/0063569 A1 * | 3/2006 | Jacobs et al. | 455/575.1 |

FOREIGN PATENT DOCUMENTS

| | | |
|---|---|---|
| CN | 1578342 | 2/2005 |
| CN | 101036306 A | 9/2007 |
| KR | 10-0719002 | 5/2007 |
| WO | WO-2006/014088 A1 | 2/2006 |

OTHER PUBLICATIONS

Specification Sheet, Model Palm Tungsten T3, www.palm.com/europe, 2 pgs., 2003.
Motorola phone photo, mobile-review.com, 1 pg., Feb. 26, 2004.

* cited by examiner

Primary Examiner — Nay A Maung
Assistant Examiner — Angelica Perez
(74) Attorney, Agent, or Firm — Harrington & Smith

(57) ABSTRACT

A hand portable electronic device having a plurality of modes of operation including a communications mode and an application mode, and having a first component and a second component, wherein the first component is movable relative to the second component between a first position and a second position and wherein movement of the first component to the first position causes the device to operate in the communications mode and movement of the first component to the second position causes the device to operate in the application mode.

20 Claims, 4 Drawing Sheets

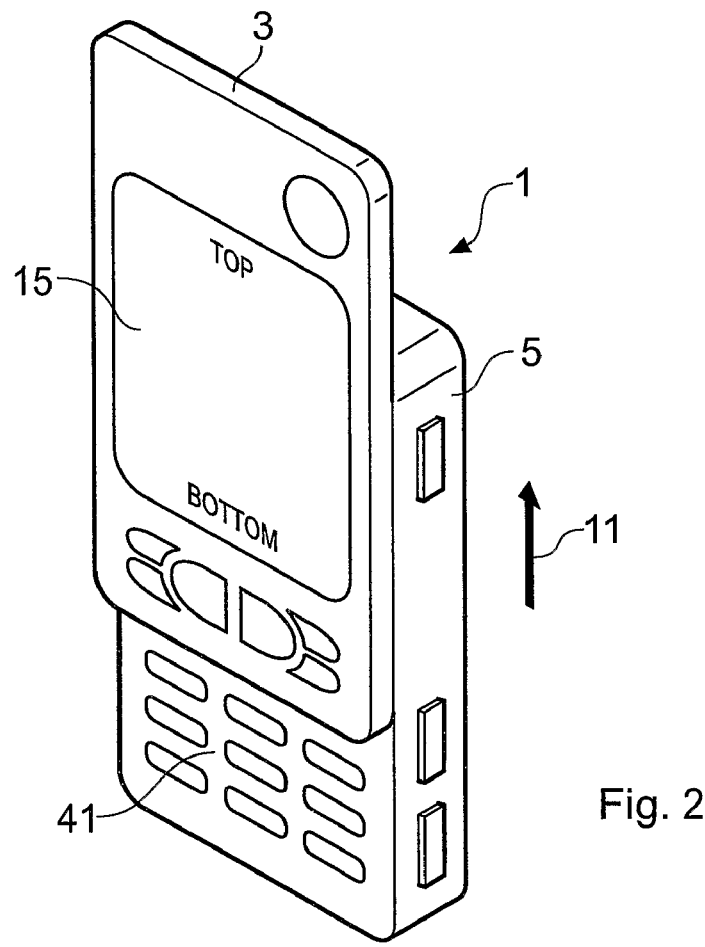
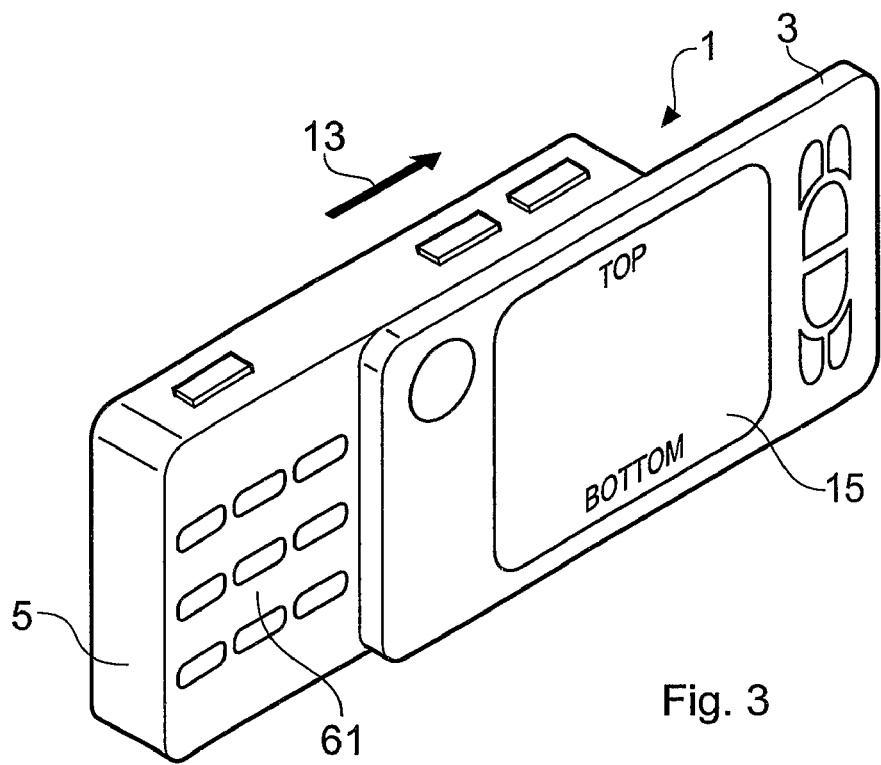

HAND PORTABLE ELECTRONIC DEVICE HAVING A PLURALITY OF MODES OF OPERATION

FIELD OF THE INVENTION

Embodiments of the present invention relate to hand portable electronic devices having a plurality of modes of operation. In particular, they relate to hand portable electronic devices having a plurality of modes of operation including a communications mode and a camera mode.

BACKGROUND TO THE INVENTION

Current hand portable electronic devices often have more than one functional mode. For example portable telephones are often operable as a camera as well as being able to make and receive calls and messages. A user interface which is suitable for use with the apparatus when in one mode may be less suitable for use when the apparatus is in another mode. For example, portable telephones often have a display with a height greater than the width whereas camera displays often have a width greater than the height. Previous proposals to address this problem include portable telephones having a display which is rotatable relative to a keypad so that the user can change the orientation of the display relative to the keypad.

BRIEF DESCRIPTION OF THE INVENTION

According to one embodiment of the invention there is provided a hand portable electronic device having a plurality of modes of operation including a communications mode and an application mode, and having a first component and a second component, wherein the first component is movable relative to the second component between a first position and a second position and wherein movement of the first component to the first position causes the device to operate in the communications mode and movement of the first component to the second position causes the device to operate in the application mode.

Advantageously, the device is operable in the application mode as a camera. Advantageously when the first component is in the first position a first user input means is available for use by a user and when the first component is in the second position a second user input means is available for use by a user.

This provides the advantage that the device has different user inputs for each mode. Each user input can be designed for the relevant mode of operation. For example the different user inputs may have different keys and may be arranged in different orientations.

The device may also have a display, the orientation of images created on the display being dependent on the relative positions of the first and second components.

This provides the advantage that the device is usable in different orientations in respective modes of operation. In one example, in one mode, the device has a display in which the height is longer than the width whilst in another mode the device has a display in which the width is longer than the height. This allows for a more versatile electronic device.

BRIEF DESCRIPTION OF THE DRAWINGS

For a better understanding of the present invention reference will now be made by way of example only to the accompanying drawings in which:

FIG. 2 illustrates the device in a second configuration, FIG. 3 illustrates the device in a third configuration.

DETAILED DESCRIPTION OF EMBODIMENTS OF THE INVENTION

Figure 1:
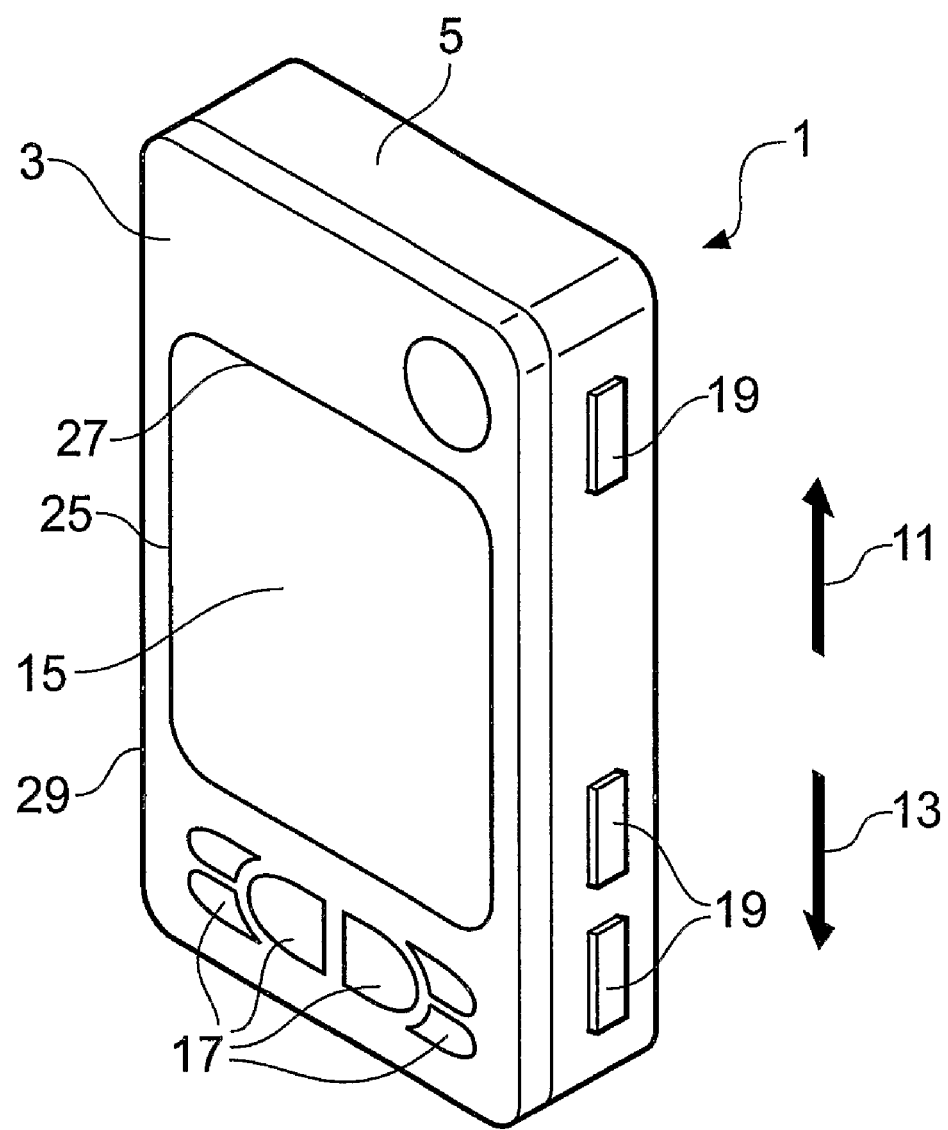
FIG. 1 illustrates a hand portable electronic device according to the present invention in a first configuration.

The Figures illustrate a hand portable electronic device 1 having a plurality of modes of operation, including a communications mode and an application mode, and having a first component 3 and a second component 5, wherein the first component 3 is movable relative to the second component 5 between a first position (FIG. 2) and a second position (FIG. 3) and wherein movement of the first component 3 to the first position causes the device 1 to operate in the communications mode and movement of the first component 3 to the second position causes the device 1 to operate in the application mode.

In this embodiment, the device 1 is generally rectangular, as can be seen from the drawings. In the following description 'portrait orientation' means the device is orientated so that the height of the device when viewed is greater than the width. 'Landscape orientation' means the device 1 is orientated so that the width is greater than the height. The terms 'portrait' and 'landscape' are also used in corresponding manner in relation to displayed images, to indicate the orientation of a rectangular image.

FIG. 1 illustrates a hand portable electronic device 1 having a first component 3 and a second component 5. The first component 3 is movable relative to the second component 5. In this particular embodiment the two components are arranged so that the first component 3 can slide along the second component 5 in the directions of the arrows 11 and 13. In other embodiments the components may be arranged in a different manner, for example, the two components may be arranged so that they can rotate relative to each other.

In the configuration shown in FIG. 1 the device 1 is operable as a basic communications device and a basic camera. That is, the device 1 is operable to make and receive telephone calls and take photographs. More complex functions, such as editing photographs or entering phone numbers or text messages are not available to the user.

The first portion 3 has a display 15 for displaying information to a user. This information may be, for example, the identity of an incoming caller or a photograph which has been taken by the user.

In this embodiment the display 15 is substantially rectangular. The edges 25 and 27 of the display 15 are perpendicular to each other and edge 25 is longer than edge 27. In this embodiment the device 1 is also substantially rectangular, as has been noted above, and the display 15 is arranged on the device 1 so that the longer edge 27 of the display 15 is parallel with the longer edge 29 of the device 1. This means that when the user holds the device 1 in portrait orientation (as shown in FIG. 1) the display 15 is also in portrait orientation. Likewise when the device 1 is held in landscape orientation the display 15 is also landscape. In other embodiments the display 15 and the device 1 may be different shapes or may be arranged differently with respect to the device 1.

The device 1 also has user input means 17 and 19 which are accessible when the device 1 is in the first configuration. In this particular embodiment the input means 17 are located on the first component 3 and allow the user to use the basic communications functions available, for example to answer an incoming call. The user input means 19 are located on the second component 5 and allow the user to use the basic camera functions, for example to take a photograph. In other embodiments these user input means could both be located on one of the components or the two user input means could be integrated into a single user input means.

In this embodiment the user input means 17 and 19 are keys. Other user input means could be used. The available user input means 17 and 19 are only required to be simple, because only basic functions are available for use.

FIG. 2 illustrates the device 1 in a second configuration. This configuration is reached by sliding the first portion 3 along the second portion 5 in the direction of the arrow 11. Sensors 82 (FIGS. 4 and 5) are provided to determine when the first component 3 is moved from one position to another. The sensors 82 determine which of the configurations the device 1 is being arranged into and switch the device 1 from one functioning mode to another. The sensors 82 are shown only schematically in the drawings (FIGS. 4 and 5), because a wide range of possible sensors will be known to the skilled reader, including mechanical or magnetic switches, mechanical, optical or magnetic sensors or moving electrical contacts. Thus when the device 1 is arranged into the configuration of FIG. 2, the sensors 82 detect the movement of the first component 3 along the second component 5 and the device 1 switches into a full communications mode. Additional communications functions, which are not operable when the device 1 is in the first configuration, become operable when the device 1 is arranged into the second configuration. These functions may include the entering of telephone numbers or text messages.

Sliding the first component 3 into the second configuration reveals user input means 41 which are not accessible when the device 1 is in the first configuration. The user input means 41 are for using the device 1 in the full communications mode. They allow, for example, the entry of numerical or text information such as a telephone number or a text message. In this particular embodiment the user input means 41 is a key pad. Other user input means could be used, for example a joy stick.

When the device 1 is in the full communications mode it is intended to be used in the portrait orientation. Any images or text displayed on the display 15 will also be displayed in portrait orientation on the display 15, so that they are the correct way up when viewed with the device 1 in portrait orientation. The user input means 41 is arranged for convenient use with device 1 and display 15 both in portrait orientation. The keys in the input means 41 may be labelled to indicate the function or functions associated with each key, these labels being arranged so that they are the right way up when viewed with the device 1 in portrait orientation.

In this embodiment when the device 1 is used in the portrait orientation the display 15 is positioned above the user input means 41.

FIG. 3 illustrates the device 1 in a third configuration. To arrange the device 1 into this configuration the user must slide the first component 3 in the direction of the arrow 13, that is, in the opposite direction to the way in which the component 3 is moved to arrange the device 1 into the second configuration.

As the device 1 is moved this configuration, the sensors 82 detect the relative positions of the two components 3 and 5 and the device 1 switches into a full camera mode, an application mode which, in this example, causes the device to function with a wider range of camera functions than are provided in the first configuration (FIG. 1), and is thus termed herein "full camera mode". This mode makes use of a camera iris 84 (FIG. 6) and corresponding internal camera hardware (not shown). Additional camera functions which are not available in the first or the second configurations become operable in this configuration, as noted above. For example in this mode the user may be able to edit photographs or add text onto images.

However, the additional communications functions described above, which are operable when the device is in the second configuration, are not operable in this configuration. For example, the user may not be able to enter telephone numbers or text messages.

When the first component 3 is moved into this position a further, different user input means 61 is revealed. This user input means 61 is not accessible when the device 1 is in either the first or second configuration. The user input means 61 are for using the device 1 in the full camera mode. They allow, for example, editing photographs and adding text to images. In this particular embodiment the user input 61 means is a key pad. Other user input means could be used, for example, a joy stick.

When the device 1 is in the full camera mode it is intended to be used in landscape orientation. Any images or text displayed on the display 15 will also be displayed in landscape orientation on the display 15 so that they are the correct way up when viewed with the device 1 in landscape orientation.

The user input means 61 is arranged for convenient use when the device 1 and the display 15 are both in landscape orientation. The keys in the input means 61 may be labelled to indicate the function or functions associated with each key, these labels being arranged so that they are the right way up when viewed with the device 1 in the landscape orientation.

In this particular embodiment when the device is in the third configuration the user input means 61 are positioned to one side of the display 15. In other embodiments the user input means 61 could be positioned elsewhere. For example, there could be keys positioned on either side of the display 15.

In this embodiment the orientations of the user input means 41 and 61 (including the orientation of the individual keys) are rotated 90 degrees from each other and only one of the input means 41 or 61 is accessible at any one time.

In the described embodiment the device has a communications mode and an application mode in which the device is operable as a camera. Other application modes are possible, by appropriate choice of hardware and software activated when in the third configuration. For example, the application mode could be a gaming mode, which would allow a user to operate the device to play and download games or the application mode could be a diary mode which would allow a user to enter data into a calendar or reminder system. The applications mode could be a combination of more than one application. The form of user input means provided in the third configuration is preferably chosen in accordance with the nature of the application and may include joysticks and equivalent devices, keypads and other user input devices.

Figure 4:
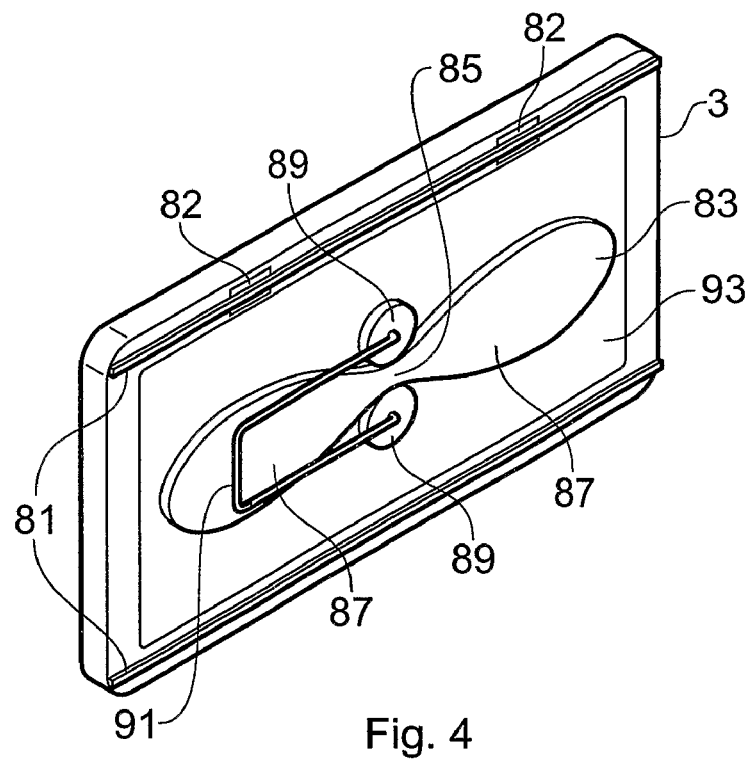
FIG. 4 illustrates a part of the slide mechanism on one portion of the device.
Figure 5:
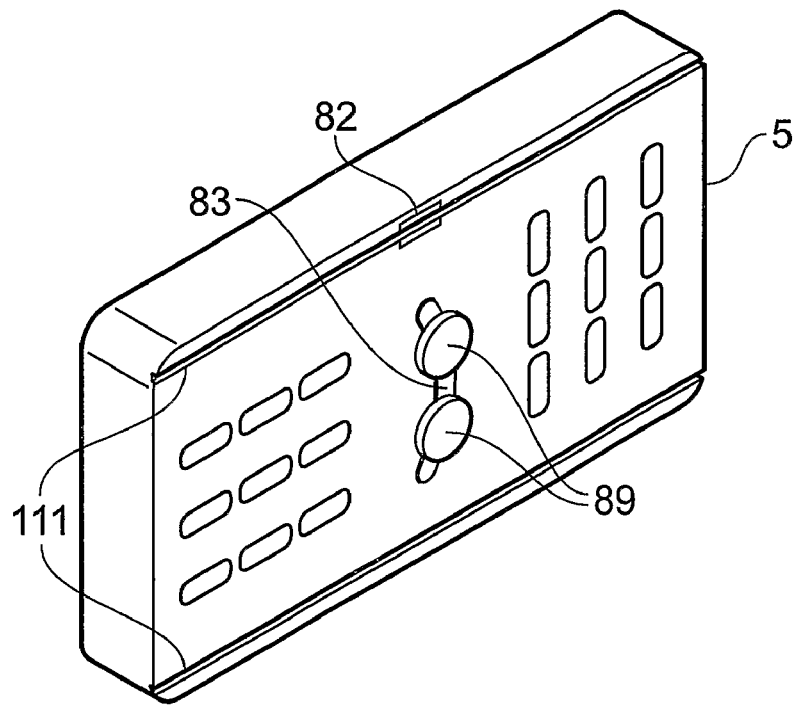
FIG. 5 illustrates a part of the slide mechanism on the other portion of the device
Figure 6:
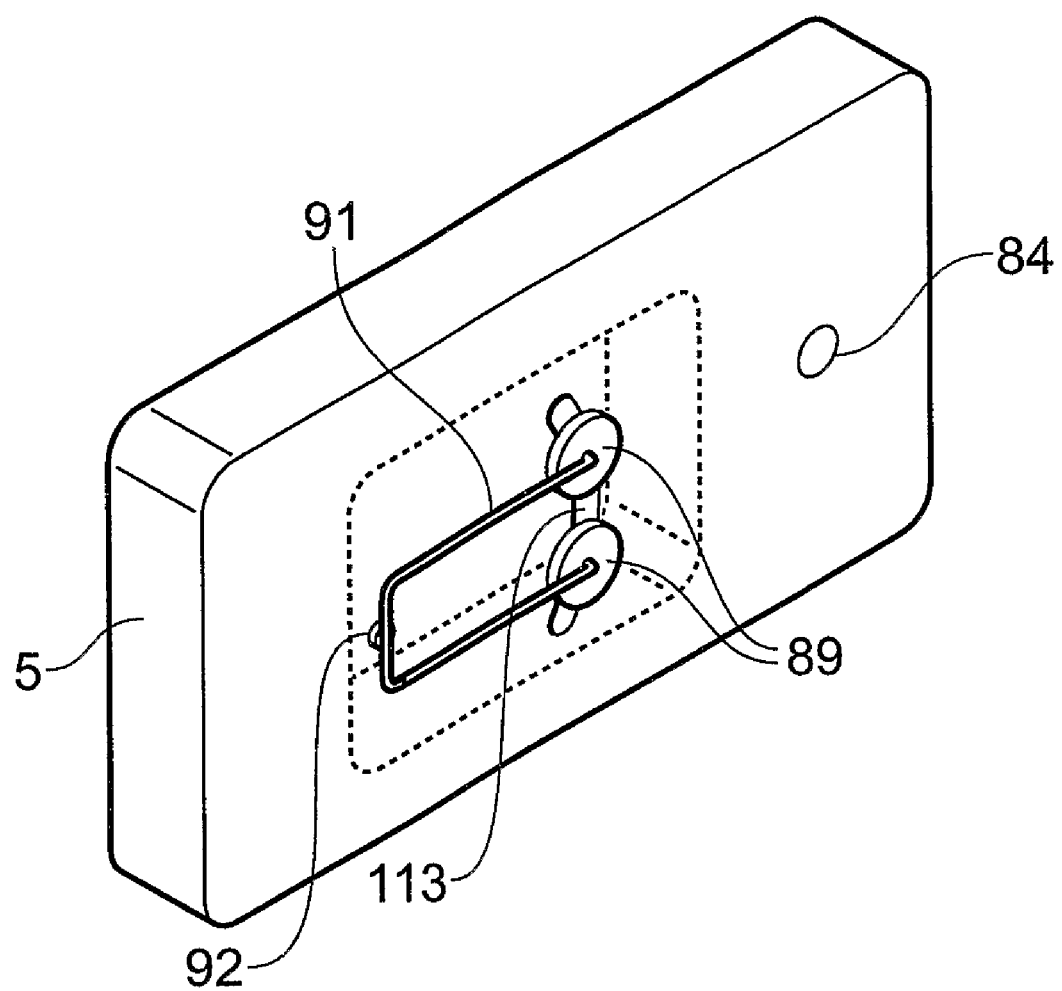
FIG. 6 illustrates a part of the assembled slide mechanism, with part of the device cut away.

FIGS. 4 to 6 illustrate an embodiment of the sliding mechanism of the device 1 in more detail. Other sliding mechanisms may be used.

FIG. 4 shows the rear face of the first component 3, with the second component 5 not shown, for clarity. The first component 3 has a guide rail 81 on either side which can fit into corresponding grooves 111 on the second component 5.

The first component 3 also has a raised cam portion 83 on the surface 93. In this embodiment the raised portion 83 has a narrow central waist 85 and two wider lobes 87 on either side. Two rotatable cam followers 89 are carried by the second component 5 and positioned abutting the raised portion 83, one either side of the raised portion 83. The cam followers 89 are able to roll along the length of the raised portion 83 as the components 3 and 5 move relative to each other.

The cam followers 89 are mounted on the second component by a U-shaped spring 91. The spring 91 acts to force the two cam followers 89 together so that they bear against the raised portion 83 at all times.

The spring 91 is attached to the second component 5 at 92 (FIG. 6).

FIG. 5 illustrates the second component 5 of the device 1 with the first component 3 removed for clarity.

The second component has a groove 111 on each side into which the guide rails 81 of the first component 3 can be slotted. The cooperation of the guide rails 81 and the grooves 111 allows the first component 3 to slide relative to the second component 5. The cam followers 89 are supported at a slot 113 through which the spring 91 extends. The slot 113 allows the cam followers 89 to move apart or together as they roll along the edges of the raised portion 83.

FIG. 6 illustrates the second component 5 from beneath. The dotted lines show a portion which has been cut away for clarity. This shows the spring 91 attached to the second component 5. The spring 91 is attached at 92 to the second component 5 by the base of the U-shape. The spring 91 is attached underneath the user input means 41.

It can be readily understood that the shape of the raised portion 83 provides three preferred positions of the cam followers 89, at the ends and at the waist 85 of the portion 83. These positions correspond with the three configurations of the device 1 being described, so that the user can positively feel the device 1 entering each configuration.

The device 1 described above has a plurality of modes of operation and a first component 3 which is movable relative to a second component 5. In this particular embodiment the modes are a communications mode, a camera mode (or other application mode) and a basic mode in which only basic camera and basic communications functions are operable. To switch the device 1 between the modes the user must move the first component 3 relative to the second component 5

When the device 1 is not being used, for example when it is being carried in a pocket or a handbag, it can be left in the first configuration shown in FIG. 1. In this configuration the device 1 can receive incoming calls and messages and can be use to take photographs. In this configuration the first component 3 completely overlays the second component 5. This is the most compact configuration for the device 1 and therefore the most suitable for transporting the device 1.

When the user wishes to use the device 1 in the full communications mode, for example, if they wish to enter a telephone number or a text message, they can slide the first component 3 into the second configuration shown in FIG. 2. The sensors 82 will sense the movement of the first component 3 and switch the device into full communications mode. When the device 1 is switched into full communications mode additional communications functions become activated and the display 15 will display images in portrait mode. The user input means 41 is only accessible when the device 1 is in this configuration. This user input means 41 is designed for use with a portrait communications device.

When the user wants to use the device 1 in the full camera mode (in this example) they must move the first component 3 into the third configuration. The sensors 82 detect this change in the configuration and switch the device 1 into camera mode. This activates camera functions which are not activated when the device 1 is in either the first or second configurations. In camera mode the display 15 operates as a landscape display and the input means 61 is designed for use in landscape orientation.

Thus the device 1 has several functioning modes and the configuration of the device 1 determines which mode is operable. The device 1 is operable either in the portrait orientation or the landscape orientation, as appropriate to the mode, and the display 15 and input means 17, 19, 41 and 61 presented to the user are designed for use in the appropriate orientation.

Although embodiments of the present invention have been described in the preceding paragraphs with reference to various examples, it should be appreciated that modifications to the examples given can be made without departing from the scope of the invention as claimed. For example, the device has been described as having a basic mode, a full communications mode and a full camera mode. In other examples, the device may have the basic mode and one of the full modes, but not both, or may have both full modes but not a basic mode. Additional modes can be envisaged, giving a total of more than three. The choice of which functions are available in which the mode can be varied according to the intended use of the device, and the design of the user input means can be modified according to this choice.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A hand portable electronic device having a plurality of modes of operation including a communications mode, an application mode, and a basic mode, and having a user input part and a display part comprising a display, wherein the user input part is movable relative to the display part between a first position in which a first portion of the user input part, comprising a first user input, is accessible and a second portion of the user input part, comprising a second user input, is not accessible while it is located behind the display part and a second position in which the second portion of user input part, comprising the second user input, is accessible and the first portion of the user input part, comprising the first user input, is not accessible while it is located behind the display part and wherein movement of the user input part to the first position causes the device to operate in the communications mode and movement of the user input part to the second position causes the device to operate in the application mode, wherein the user input part is configured to move in substantially a same plane between the first position and the second position wherein the device is configured to operate in the basic mode when the first user input and the second user input are not accessible, and wherein the basic mode comprises at least one of a basic communication function and a basic camera function.

2. A hand portable electronic device as claimed in claim 1, wherein the first user input is orientated on the device for use by a user when the device is in a first orientation and the second input is orientated on the device for use by a user when the device in a second orientation.

3. A hand portable electronic device as claimed in claim 2 wherein the first and second orientations are substantially perpendicular to each other.

4. A hand portable electronic device as claimed in claim 1 wherein the first user input includes a first keypad and the second user input comprises a second, different, keypad.

5. A hand portable electronic device as claimed in claim 1 wherein the user input part is movable relative to the display part into a third position in which the second portion of user input part, comprising the second user input, is not accessible because it is located behind the display part and the first portion of the user input part, comprising the first user input, is not accessible because it is located behind the display part and wherein when the user input part is in the third position the device is in the basic mode.

6. A hand portable electronic device as claimed in claim 5 wherein in the basic mode the device can function as both a communications device and a camera.

7. A hand portable electronic device as claimed in claim 5 wherein in the basic mode, the range of functions available is reduced relative to the ranges available in the first and second modes.

8. A hand portable electronic device as claimed in claim 1, wherein the user input part does not comprise a display.

9. A hand portable electronic device as claimed in claim 1, wherein the display part comprises a third user input associated with the display.

10. A hand portable electronic device as claimed in claim 9, wherein the third user input comprises a plurality of keys, the function of which is indicated by labels displayed on the display with an orientation wherein the orientation of the labels is different between the application mode and the communication mode.

11. A hand portable electronic device as claimed in claim 1 wherein the user input part is slidable under the display part, wherein the second user input is spaced from a camera portion of the device, and wherein the second user input comprises at least two user input members.

12. A hand portable electronic device as claimed in claim 1 wherein the device is operable in the application mode as a camera.

13. A hand portable electronic device as claimed in claim 1 wherein the first user input are for controlling the device in the communications mode.

14. A hand portable electronic device as claimed in claim 1 wherein the second user input are for controlling the application provided in the application mode.

15. A hand portable electronic device as claimed in claim 1 wherein the orientation of images created on the display is dependent upon the relative positions of the user input part and the display part of the device, so that the device is usable in different orientations in respective modes of operation.

16. A hand portable electronic device as claimed in claim 1 wherein the display is substantially rectangular.

17. A hand portable electronic device as claimed in claim 15 wherein when the user input part is in the first position display images are created as a portrait display.

18. A hand portable electronic device as claimed in claim 15 wherein when the user input part is in the second position display images are created as a landscape display.

19. A hand portable electronic device as claimed in claim 1 wherein the user input part is slidable relative to the display part, and wherein the second user input is configured to be depressed by a user of the device.

20. A hand portable electronic device as claimed in claim 1 wherein the device comprises a guide rail, a raised cam portion, and a sensor, wherein the guide rail is between the user input pat and the display part, wherein the raised cam portion is spaced from the guide rail, wherein a length, of the raised cam portion extends substantially perpendicular to the guide rail, and wherein the sensor detects the relative positions of the user input part and the display part.

* * * * *